(No Model.)

J. P. PUTNAM.
COUPLING FOR WATER CLOSETS.

No. 377,776. Patented Feb. 14, 1888.

Witnesses.
Wm. S. Rogers.
Waldron Bates.

Inventor:
J. Pickering Putnam
by W. W. Swan.
his atty

UNITED STATES PATENT OFFICE.

J. PICKERING PUTNAM, OF BOSTON, MASSACHUSETTS.

COUPLING FOR WATER-CLOSETS.

SPECIFICATION forming part of Letters Patent No. 377,776, dated February 14, 1888.

Application filed November 14, 1887. Serial No. 255,049. (No model.)

*To all whom it may concern:*

Be it known that I, JOHN PICKERING PUTNAM, of Boston, Massachusetts, have invented a new and useful Improvement in Couplings for Water-Closets and Similar Fixtures, of which the following is a specification.

The invention relates to a coupling for a water-closet or similar fixture formed of earthenware, in which the connection between the fixture and the pipe to be attached thereto must be made from the outside. It is particularly applicable to fixtures of earthenware, since such fixtures cannot well be threaded, and with them it is undesirable to use bolts.

As in fixtures used heretofore, I employ a gasket of rubber or similar elastic material as a packing between the earthenware and the pipe; but, unlike the gasket of any fixture heretofore made, the gasket used in my coupling so intervenes as to prevent the possibility of any contact between the metal and earthenware.

Figure 1:
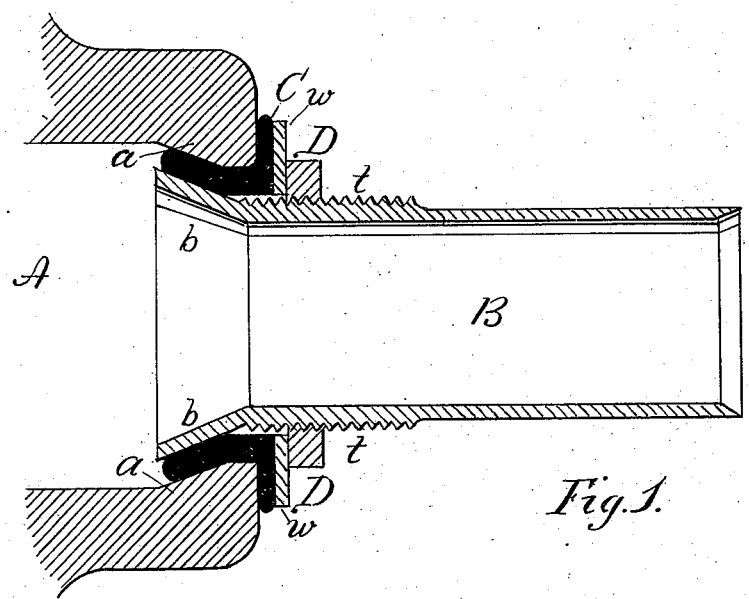
Figure 2:
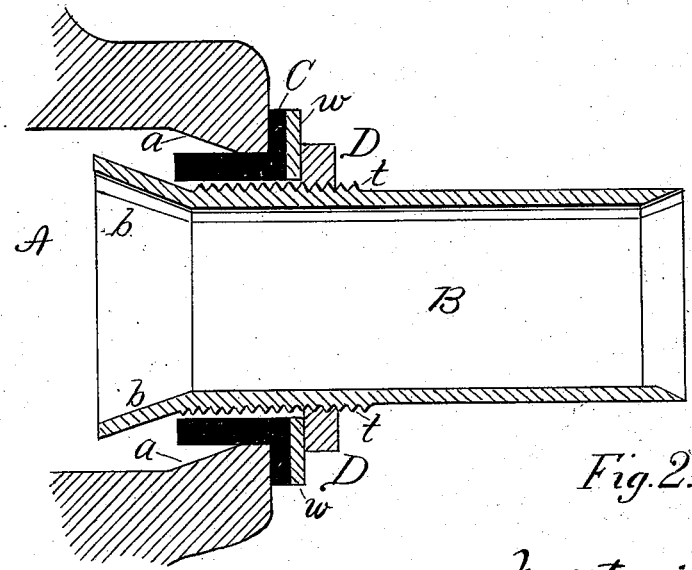

In the drawings, Figure 1 represents in section so much of a fixture and pipe attached thereto as is necessary to illustrate the invention. Fig. 2 is a detail illustrating the manner in which the connection is made.

A is a hollow projection from the fixture, having an inwardly-projecting annular shoulder, $a$, both formed in a single piece, with the fixture in the baking.

B is a metal pipe having an outwardly-projecting annular shoulder, $b$, and a thread, $t$.

C is a rubber gasket, forming a packing and protecting the rim of the projection A and shoulder $a$ from contact with any metal, as shown.

D is a clamping-nut working upon the thread $t$ of pipe B, and $w$ is a washer inserted between the nut and the earthenware protected by the gasket.

The manner in which the desired connection is made is as follows: The gasket C is slipped onto pipe B, into the position shown at Fig. 2. Pipe B is then inserted into the opening in the projection A so far that the annular shoulder $b$ clears the annular shoulder $a$ some little distance, as also shown at Fig. 2, when the clamping-nut D, being applied to the pipe with the intervening washer $w$ and screwed up, draws the two shoulders together and clamps the gasket in the position shown in Fig. 1.

I claim—

A water-closet or similar fixture of earthenware provided with an opening having an inwardly-projecting annular shoulder, in combination with a threaded metal pipe inserted in said opening and having an outwardly-projecting annular shoulder, a clamping-nut on said threaded pipe, and an elastic gasket clamped between said annular shoulders and between the rim of the said opening in the earthenware and the nut, substantially as described.

J. PICKERING PUTNAM.

Witnesses:
WM. S. ROGERS,
WALDRON BATES.